United States Patent [19]

Ito

[11] Patent Number: 5,433,567
[45] Date of Patent: Jul. 18, 1995

[54] CONNECTION BOLT ASSEMBLY WITH LOCKING MEANS

[76] Inventor: Yoichi Ito, 7 Wanda La., Orinda, Calif. 94563

[21] Appl. No.: 125,608

[22] Filed: Sep. 22, 1993

[51] Int. Cl.$^6$ .......................... F16B 39/12; F16B 39/24
[52] U.S. Cl. ..................... 411/150; 411/157; 411/228
[58] Field of Search ............... 411/149, 150, 157, 158, 411/228, 229, 224, 226, 231

[56] References Cited

U.S. PATENT DOCUMENTS

| | | | |
|---|---|---|---|
| 518,165 | 4/1894 | Thalaker | 411/228 |
| 591,892 | 10/1897 | Smith | 411/157 |
| 688,273 | 12/1901 | Ward . | |
| 831,747 | 9/1906 | Russell . | |
| 839,235 | 12/1906 | Van Boxel | 411/157 X |
| 859,054 | 7/1907 | Fischer | 411/157 X |
| 1,058,386 | 4/1913 | Price . | |
| 1,116,350 | 11/1914 | Bystrom | 411/149 X |
| 1,210,758 | 1/1917 | Brand . | |
| 1,210,919 | 1/1917 | Ellmann | 411/158 X |
| 1,269,532 | 6/1918 | Gasser . | |
| 1,321,270 | 11/1919 | Wrayge, Jr. | 411/228 X |
| 1,622,581 | 3/1927 | Gunkel . | |
| 1,877,384 | 9/1932 | Burkhalter | 411/149 X |
| 1,901,744 | 3/1933 | Glover | 411/228 |
| 1,930,783 | 10/1933 | Watson et al. . | |
| 1,956,846 | 5/1934 | Williams . | |
| 2,345,419 | 3/1944 | Olson | 411/157 X |

Primary Examiner—Neill R. Wilson
Attorney, Agent, or Firm—Townsend and Townsend Khourie and Crew

[57] ABSTRACT

An assembly of a bolt, a washer, a nut and locking structure for locking the bolt against rotation after the bolt, washer and nut have locked together a pair of flat, plate-like members in frictional engagement with each other. Any tendency for the bolt to rotate in a reverse direction will be prevented by the locking means. The plate members will essentially be bonded together against movement relative to each other, thereby maintaining structural integrity of the assembly. In a first embodiment, the head of the bolt has a notch for receiving one end of split ring washer. The other end of the washer is in a notch in the nut. The nut and washer define a locking unit for preventing reverse rotation of the bolt after the head of the bolt has been moved into proximity with the washer and the washer has been moved into the notch of the nut. Other embodiments are disclosed.

2 Claims, 7 Drawing Sheets

CONNECTION BOLT ASSEMBLY WITH LOCKING MEANS

BACKGROUND OF THE INVENTION

This invention relates to improvements in fasteners of the type comprised of a bolt having a threaded shank and a nut threadably mounted on the shank. More particularly, the invention relates to a bolt connector unit for interconnecting a pair of flat, plate-like members. Bolts with wedge-shaped locking means associated with them have been known and used in the past. Typical of disclosures relating to this subject matter are the following U.S. Pat. Nos. 688,273; 831,747; 1,058,386; 1,210,758; 1,269,532; 1,622,581; 1,930,783; and 1,956,846.

For the most part, these disclosures relate to specific connector applications which are generally not common to each other and which require special sizes and shapes of nuts and washers. More particularly, these disclosed fasteners are not suitable for use in frictionally coupling a pair of flat plate-like members, such as a link coupled to a flange or railroad track so as to interconnect the two members and to prevent them from separating due to long term vibration, such as by railroad trains moving over railroad tracks. For this reason, a need exists for an improved connector comprised of basic parts including a nut, a bolt with a threaded shank and a washer which cooperates with the bolt and nut to cause frictional engagement between a pair of flat plate-like members. The present invention provides such a connector.

SUMMARY OF THE INVENTION

The bolt connector of the present invention, in addition to including a bolt, a washer and a nut, also has locking structure for locking the bolt against rotation after the bolt, washer and nut have locked together a pair of flat, plate-like members in frictional engagement with each other. Any tendency for the bolt to rotate in a reverse direction will be prevented by the locking means and the two flat plate members will be essentially bonded together against movement relative to each other, thereby maintaining the structural integrity of the structural unit formed by the two flat plate members.

In a first embodiment, the head of the bolt has a notch for receiving one end of split ring washer while the other end of the split ring washer is in a notch in the ends of the washer projects transversely to the plain of the washer. The ends of the washer also extend into the notches of the nut. The nut, head and the ends of the washer define a locking unit. This locking unit is operable when the ends of the washer are in the notches and effectively block reverse rotation of the bolt after the head of the bolt has been moved into proximity with the washer and the other end of the washer has been moved into the notch of the nut.

A second embodiment of the combination of the bolt, washer and nut has a notch in the lower face of one of the flat members for receiving the upper end of the adjacent of the washer after the nut has been threaded onto the shank of the bolt and the opposite end of the washer is in the notch in the upper surface of the nut.

In a third embodiment, a pair of nuts are threaded onto the shank of the bolt and washer are between the two nuts. Locking structure is found on the washer which has ends receivable in notches in the two nuts and the nuts and washer cooperate to lock the pair of flat members in frictional engagement with each other and in frictional engagement with the head of the bolt.

In a fourth embodiment, a washer without a split ring configuration is mounted on the bolt above a washer with a split ring configuration and a nut threaded onto the shank of the bolt. The washer without a split ring configuration has a notch for receiving the adjacent end of the washer with the split ring configuration and the opposite end of last mentioned washer is in the notch of the nut.

In a fifth embodiment of the invention, one of the flat members is threaded onto the shank and a washer cooperates with the head of the bolt to form a locking means for the two flat members.

A sixth embodiment of the invention includes a nut cooperating with a washer with a split ring configuration to form a locking unit, the washer having one end in frictional engagement with a second washer without a split ring configuration. The second washer is in frictional engagement with the two flat members to force them against the head of the bolt and thereby lock the two flat members against rotation relative to the bolt.

The lock structure of the present invention generally uses the ends of the split ring washer for engaging the notched inner faces of the head of the bolt or the nut itself. While it is generally desirable to have the locking structure permanent, that is there is no reverse movement available once the locking means has been put in place, it is also sometimes desirable to be able to break the locking means and replace the washer which was initially used with another washer of the same or different quality.

It is possible to control the structural integrity of the locking means by choosing a material for the split ring washer such that the washer can be made to fail when desired. This may occur when reverse torque is applied to the bolt or when heat is applied to the washer to cause the washer to fail. The washer can be selected from anyone of a group of various materials including metal, plastic or paper. Once the locking means is destroyed, the washer can be replaced by a new washer to form a new locking means.

The permanence of the locking structure can be determined by the material of the washer and sometimes the nut and bolt head. This selection of materials is determined at the outset before the locking means is used.

The washer material can include any one of the following:

| | |
|---|---|
| steel | vinyl |
| aluminum | vinyl chloride |
| wood | stainless steel |
| paper | plastic |
| pottery | lead |
| gold | silver |
| copper | nickel |

Some of these materials are relatively softer than others; thus, they can be broken if they form part of the locking structure of the present invention. For instance, a stainless steel locking structure would be very difficult to break in contrast with a locking means which is made of wood, paper, plastic or pottery. Thus, the present invention provides a bolt connector assembly with locking structure thereon which locking structure is selected as to permanence and overall strength and integrity by the material associated with the washer on the shank of the bolt.

The primary object of the present invention is to provide an improved bolt connector which has locking means associated with it to prevent or control reverse rotation of the bolt relative to a pair of flat plate-like members so that the members will remain in tight frictional relationship at all times or, by proper selection of materials, can be caused to fail under proper control so as to avoid any failure in the structural integrity of the structural unit formed by the two flat members.

Other objects of the present invention will become apparent as the following specification progresses, reference being had to the accompanying drawings for an illustration of the invention.

BRIEF DESCRIPTION OF THE DRAWINGS

FIG. 1A is a top plan view of the head of the bolt taken along line 1A—1A of FIG. 1;

DETAILED DESCRIPTION OF THE PREFERRED EMBODIMENT

Figure 1:
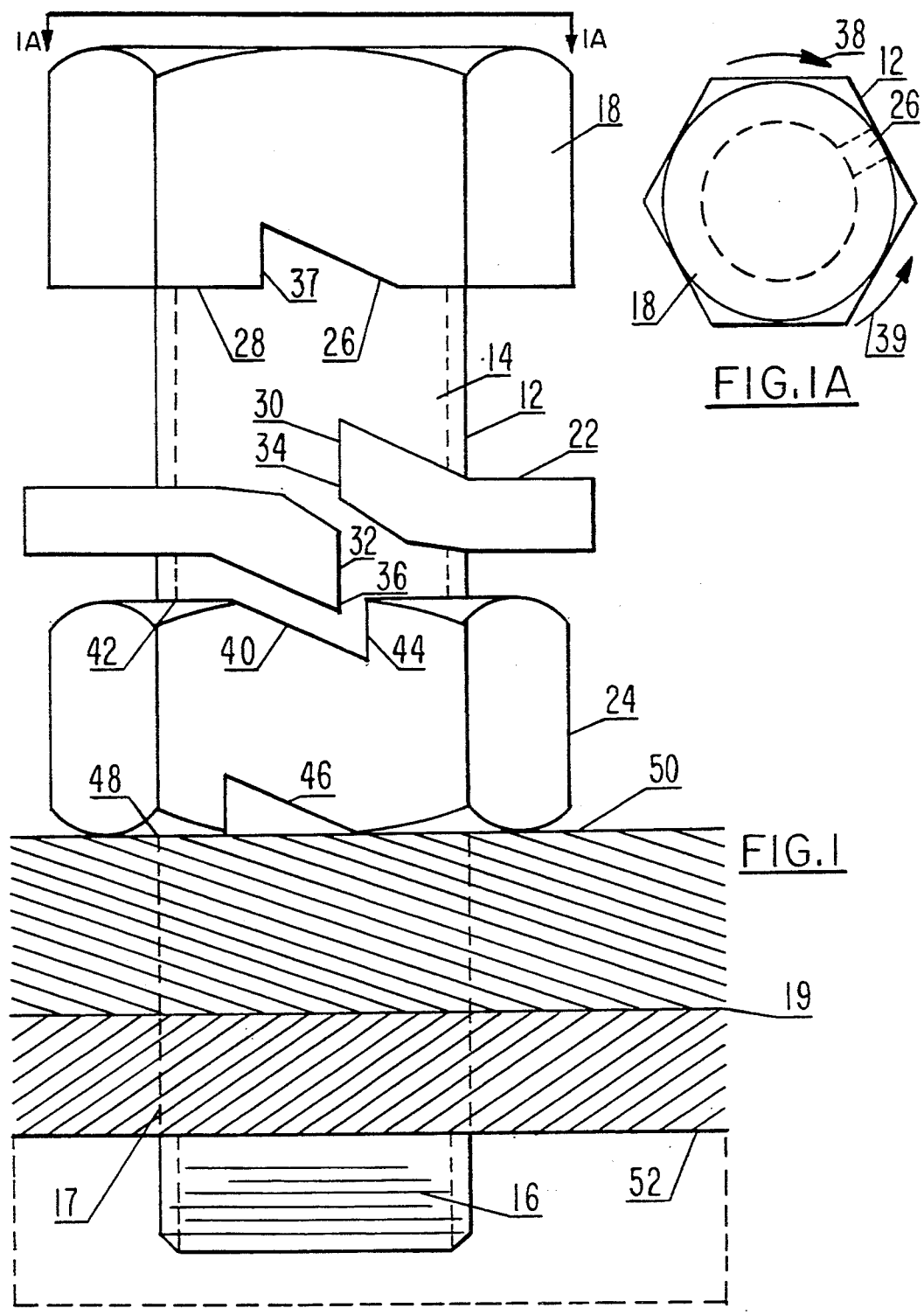
FIG. 1 is an enlarged, side elevational view of an externally threaded bolt having lock means for securing the bolt to an internally threaded platform into which the bolt is threaded.

A first, preferred embodiment of the connector bolt assembly with locking means of the present invention is broadly denoted by the numeral 10. It includes a bolt 12 having a shank 14 which is externally threaded as shown by threads 16 at one end of the shank 14. A head 18 is on the opposite end of the shank 14 which can be vertical, horizontal, inclined or other attitude, depending upon the orientation of the bolt.

A split ring washer 22 is generally flat and is shiftably mounted on shank 14 and is between head 18 and a nut 24 which is threaded onto shank 14.

Head 18 has a wedge-shaped notch 26 in the lower surface 28 thereof. There can be more than one notch 26 in surface 28; however, for purposes of illustration, only one notch 26 is shown in FIGS. 1 and 1A.

Washer 22 is split to form a pair of ends 30 and 32 which are offset relative to the plane of the washer. Also, ends 30 and 32 form flat end faces 34 and 36, end face 34 being movable into abutment with flat end face 37 formed by notch 26 in surface 28 of head 18.

Nut 24 has a notch 40 in the upper surface 42 thereof. This notch forms a flat end face 44 which is adapted to engage end face 36 of end 32 of the washer 22 when end 32 is in notch 40. There may be more than one notch 40 but for purposes of illustration, only a single notch is described herein. Nut 24 could have a second notch 46 in the bottom surface 48 thereof. This is in the case of a locking structure below the nut having a projection or end receivable in the notch.

The bolt, nut and washer combination of the present invention is adapted to couple a flat plate or other substantially flat object 50 to a substantially flat, threaded platform 52. Plate 50 and platform 52 have aligned holes which receive the bolt. The hole of plate 50 is loosely received on the bolt, and platform 52 is threaded onto the end of the bolt shank 14 as indicated by threads 16 and 17.

In use, bolt 10 is first assembled by placing washer 22 on the shank 14. Then, nut 24 is threaded onto the shank and, following this, flat plate 50 and threaded platform 52 are placed on the shank, the flat plate 50 being loosely received on the shank, and platform 52 being threaded onto the shank by rotating the shank about its longitudinal axis.

The nut 24 will be moved relative to and along shank 14 until end 30 is in wedge-shaped notch 26 and end 32 is in notch 40. The nut 24 can no longer be moved relative to the head 18 of the bolt and the shank is then rotated in a clockwise fashion as indicated by arrow 38 until the nut firmly forces the flat plate 50 into tight, frictional engagement with platform 52 at the interface 19 of plate 50 and platform 52. The shank is rotated in a clockwise sense as far as it will go, whereupon the plate 50 and platform 52 will be tightly locked into frictional engagement with each other.

There will be no tendency for the bolt to be reversed or be backed off because any such tendency for the bolt to move in a counterclockwise sense, as indicated by arrow 39 (FIG. 1A), will be resisted by the combined locking effects of washer 22 and nut 24. Also, the frictional engagement between nut 24 and the adjacent surface of plate 50 also serves to prevent rotation of the bolt relative to plate 50 and platform 52. Thus, the bolt connector assembly 10 of the present invention is suitable for any application especially an application where vibration occurs, such vibration tending to rotate the bolt in a counterclockwise sense or into a position in which the bolt becomes loose and creates a dangerous operating condition. An example of this is a rail of a railroad track becoming loose because of the vibration caused by railways vehicle moving over a track having the bolt 10 as part of the connecting link with an adjacent track.

Figure 2:
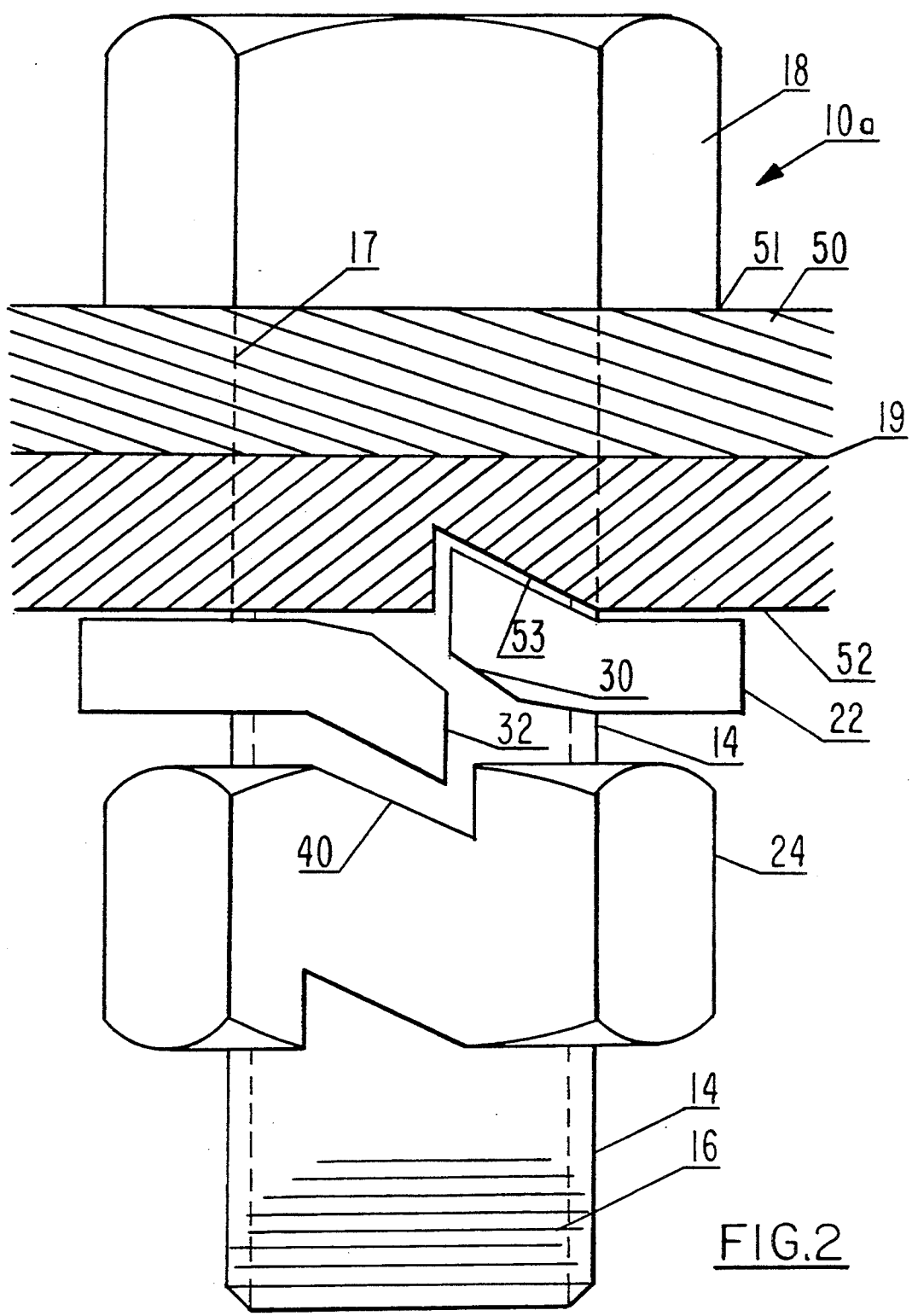
FIG. 2 is a view similar to FIG. 1 but showing the nut and washer on the bolt for coupling a wedged object to a flat platform in frictional engagement therewith.

FIG. 2 shows another embodiment of the invention denoted by the numeral 10a. Bolt connector 10a includes the head 18 on a shank 14, the shank being externally threaded to receive nut 24 and washer 22 having ends 30 and 32 respectively. The ends of the washer are out of the plane of the washer as shown in FIG. 2.

Plate 50 and platform 52 are between the head 18 and the washer 22. Part of the shank 14 extends through aligned holes in plate 50 and platform 50. Plate 50 has a flat upper surface 51 thereon for frictionally engaging the flat undersurface of head 18. Plate 50 and platform 52 have mating flat surfaces which frictionally engage each other at interface 19 when nut 24 is tightened so as to force plate 50 into frictional engagement with the underside of head 18.

End 30 of washer 22 is received within wedge-shaped notch 53 of platform 52. Similarly, end 32 of washer 22 is received within the notch 40 of nut 24. The nut is threaded onto the shank by virtue of the threads 16 on the shank.

In use, plate 50 and platform 52 are first slidably moved onto the bolt shank. If desired, platform 52 can be threaded onto the bolt as shown in FIG. 1.

The washer 22 is then placed onto the shank of the bolt and nut 24 is rotated on the shank in relation to the bolt to tighten the frictional connection between plate 50 and platform 52. When it is not possible to rotate nut 24 any further in a clockwise sense relative to and about the shank (with reference to FIG. 1A), then the nut and washer will lock plate 50 to platform 52 and the bolt cannot be rotated in a reverse direction so as to permit separation of plate 50 from platform 52. Only by use of a torch or the like can the connection be broken.

Figure 3:
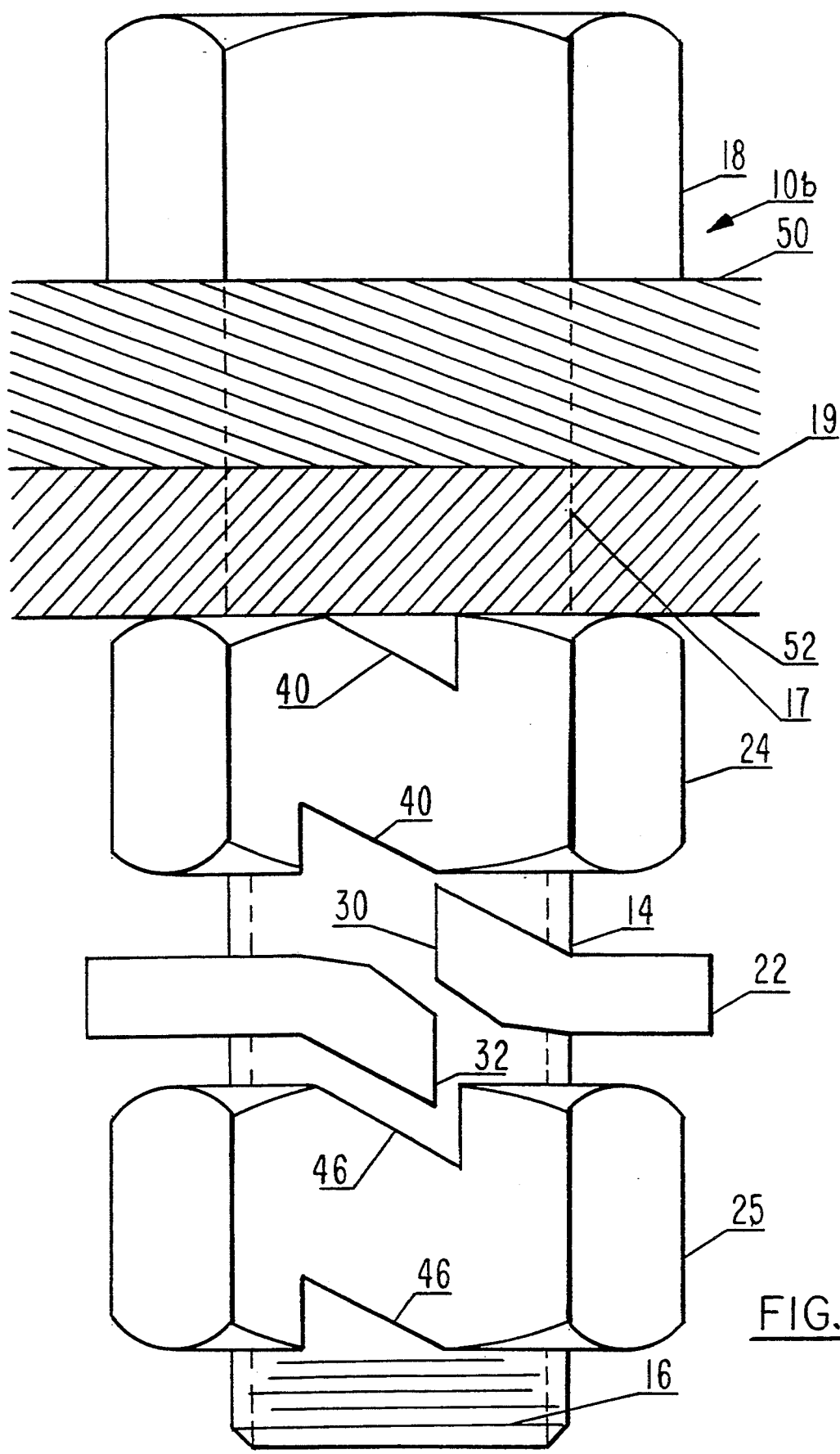
FIG. 3 is a side elevational view of a bolt with a washer and two nuts on the shank of the bolt and with a flat platform in frictional engagement with a flat plate.

FIG. 3 shows another embodiment of the bolt connector, denoted by the numeral 10b for connecting plate 50 to platform 52 where the contiguous flat faces of the two objects are in frictional engagement with each other.

Bolt connector 10b includes a bolt 12 having a shank 14 and a head 18. The bolt head does not show or need a notch because there is no projection on the upper surface of plate 50. The rest of the bolt connector 10b includes a first nut 24 and a second nut 25, both nuts being threaded onto shank 14 of bolt 12. The split ring washer has offset ends 30 and 32 as in the case of the embodiments of FIGS. 1 and 2, and the nuts 24 and 25 have wedge-shaped notches 40 and 46 for receiving respective ends 30 and 32 of the washer 22. The ends can be received in the notches because the ends of the washer are offset relative to the plane of the washer.

In use, the aligned holes of plate 50 and platform 52 receive the shank. The platform 52 may be threaded onto the shank if desired. Then, nut 24 is threaded onto shank 14 until the nut firmly engages the flat lower surface of platform 52. Then, washer 22 is placed on the shank so that the end 30 will be received within wedge 40 of nut 24. Following this, the nut 25 is threaded onto the shank and the nut 25 will be rotated until it can no longer be moved relative to the bolt. When this occurs, the nuts are locked onto the bolt and they cannot be backed off because they cannot pass the vertical end faces of the washer when the washers are in the notches 40 and 46.

Figure 4:
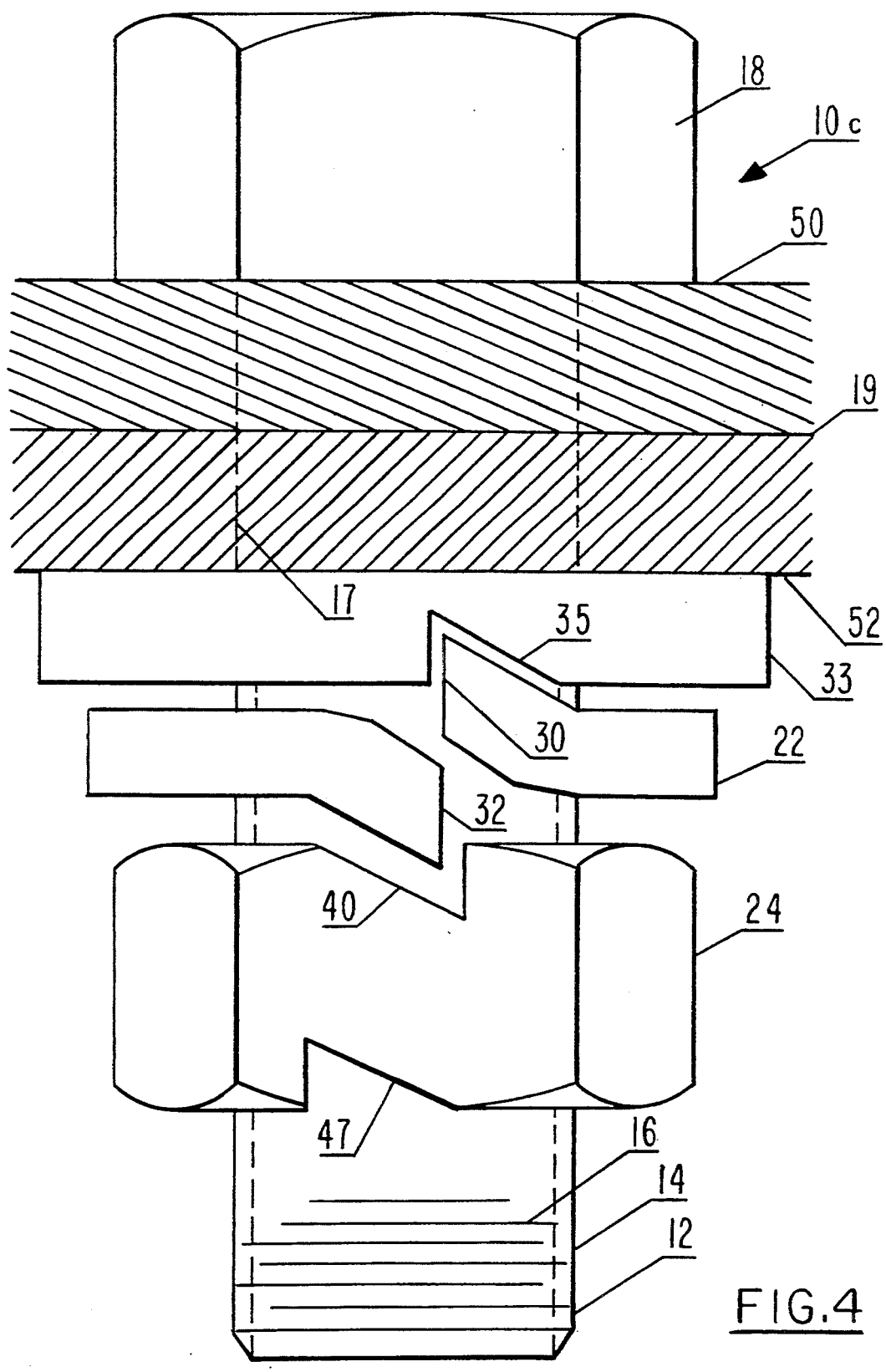
FIG. 4 is a view similar to FIG. 3 but showing an annular washer between a split ring washer and a flat platform.

Another embodiment (FIG. 4) of the present invention is broadly denoted by the numeral 10c and includes a bolt 12 having a shank 14, a nut 24, a split ring washer 22 with ends 30 and 32, and an annular washer 33 which is not split as in the case of washer 22 but has a wedge-shaped notch 35 therein for receiving end 30 of the washer 22. The foregoing components are used for locking plate 50 to a flat platform 52 and to this end, the nut 24 has an upper wedge-shaped notch 40 which receives end 32 of washer 22. The wedge-shaped notch 47 in the lower face of nut 24 is not needed in this embodiment. Plate 50 has an internally threaded pocket 51 in the center thereof for threadably receiving bolt 12.

In use, plate 50 and platform 52 are mounted on the shank of the bolt, following which the washer with the flat upper face is moved onto the shank and engages the adjacent face of platform 50. The washer 22 is then placed on the shank and nut 24 is threaded on the shank until it can rotate no further, following which the nut and washer 22 will be locked onto the shank, thereby locking platform 52 to plate 50.

Figure 5:
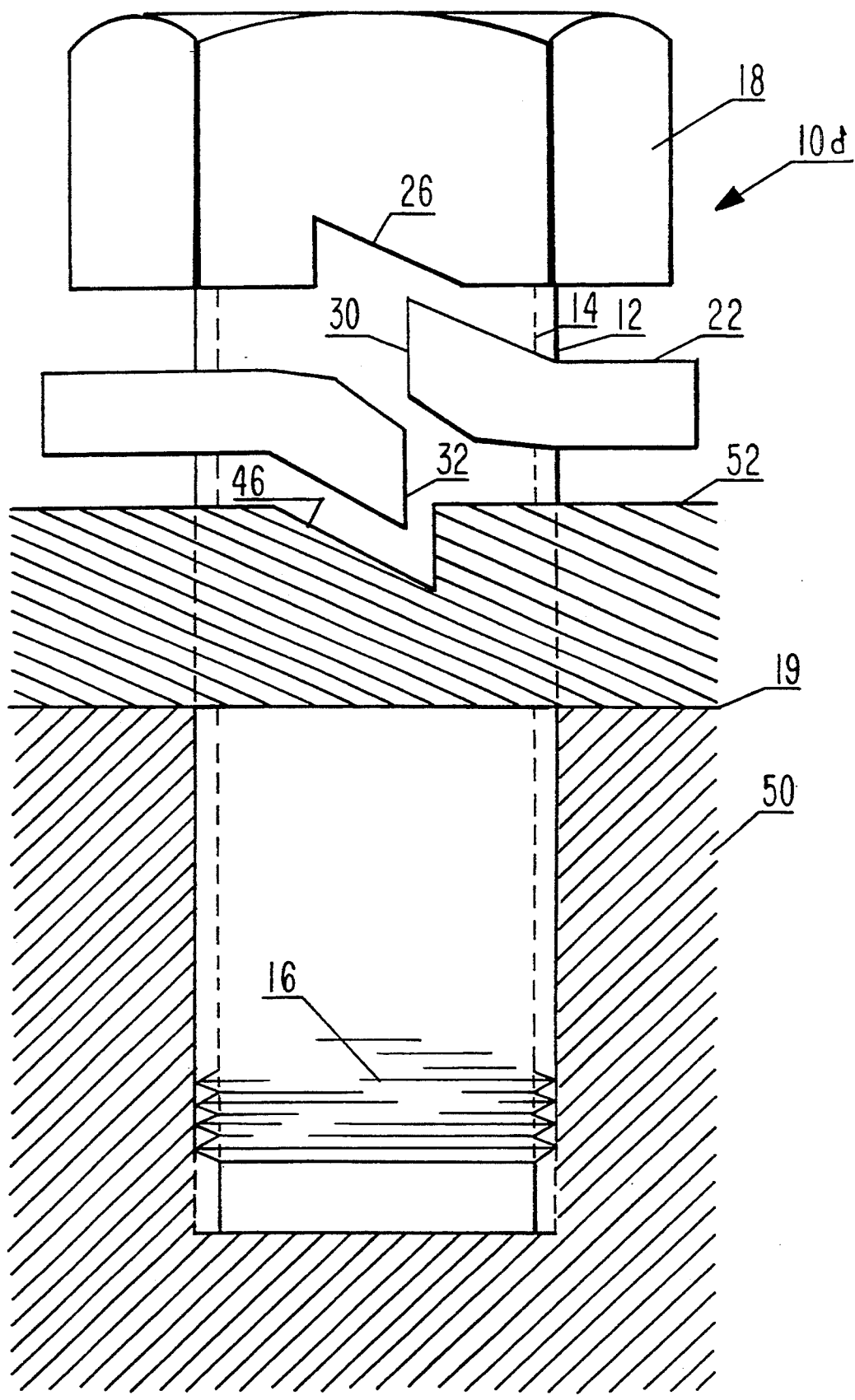
FIG. 5 is a view of an embodiment having an internally threaded hole in a flat platform for threadably receiving the bolt.
Figure 5A:
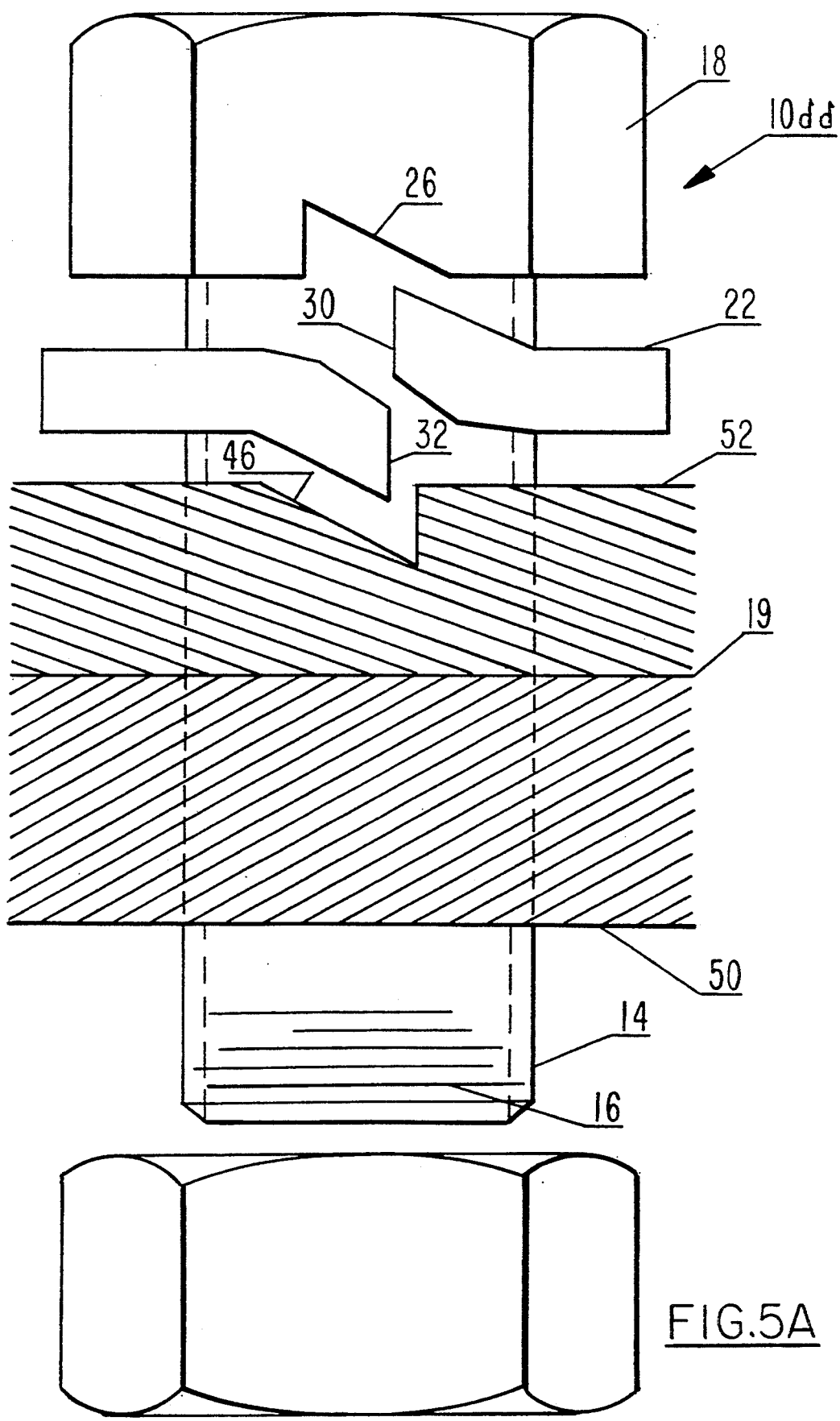
FIGS. 5A and 6 are views similar to previous views to show other embodiments.

FIG. 5 shows another embodiment of the present invention as denoted by the numeral 10d. It includes a bolt 12 with a shank 14 externally threaded to threadably receive a flat plate 50 which has an internally threaded hole for this purpose. A platform 52 is shiftably received on the shank. A split ring washer 22 having ends 30 and 32 is slidably mounted on the bolt and end 30 is to be received within the notch 26 in the lower face of head 18 while end 32 is adapted to be received within a notch 46 in the upper surface of platform 52.

In use, head 18 is threadably mounted to bolt to plate 50 and rotation continues until the shank can no longer be rotated relative to plate 50. When this occurs, end 30 will be in wedge-shaped notch 26 of head 18 and end 32 will be in the wedge-shaped notch 46 of platform 52. Thus, the bolt will be locked to the platform 50 and plate 52.

Figure 6:
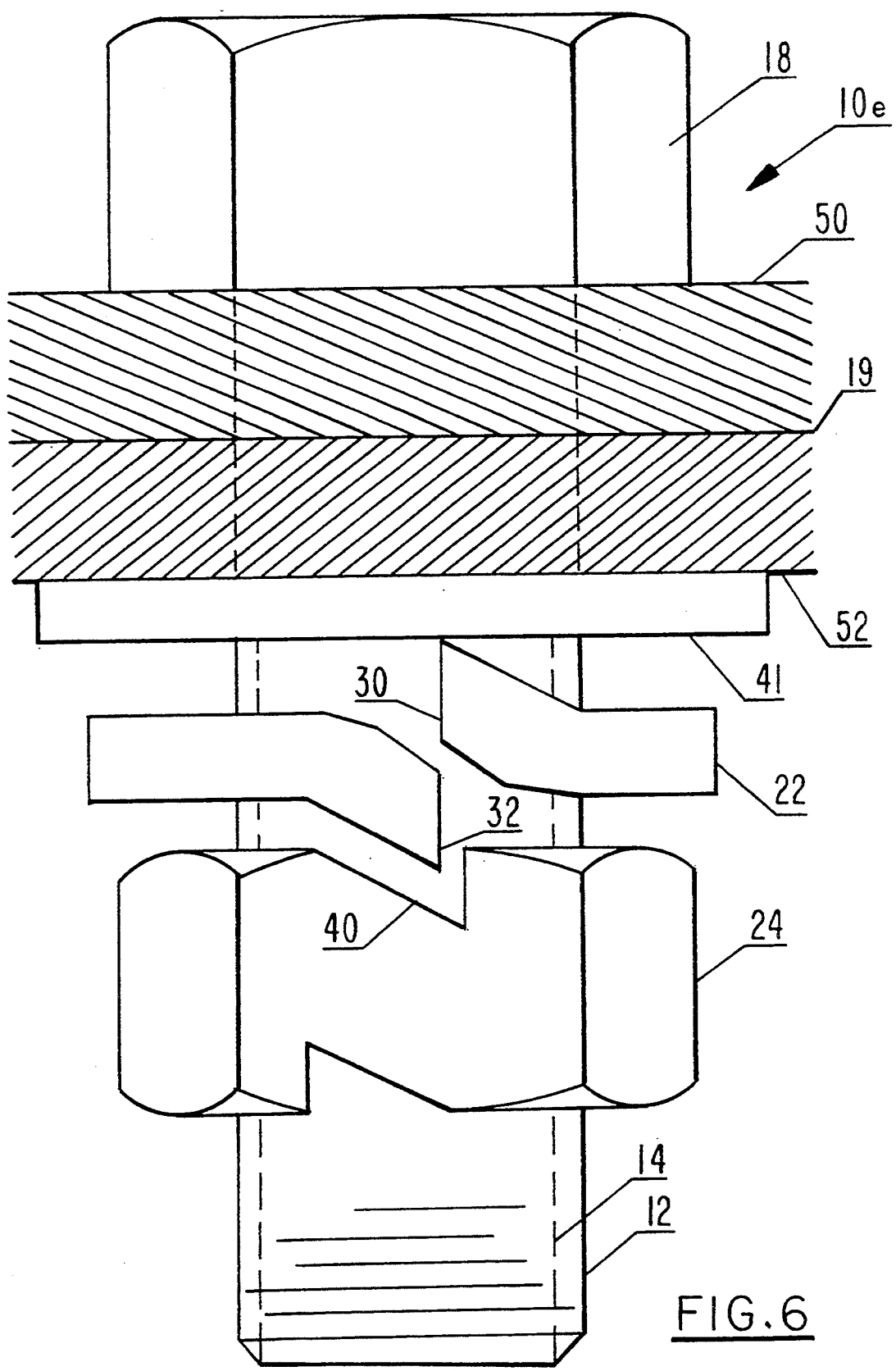

Another embodiment of the present invention is shown in FIG. 6 and is denoted by the numeral 10dd. It is substantially the same in construction as the embodiment denoted by the numeral 10d except that it has a hole through the bottom plate 50; whereas, plate 50 of assembly 10d has no hole through which the bolt can emerge.

In an embodiment denoted by 10e (FIG. 6), flat washer 41 is between the washer 22 and platform 52 below plate 50. The nut 24 threaded onto the shank 14 of bolt 12 forces the washer 22 into frictional engagement at end 30 with the lower face 39 of washer 37. When this occurs, end 32 is in the wedge-shaped notch 40 on the upper surface of the nut.

In use, platform 52 and plate 50 are mounted on the shank, following which washers 37 and 22 are placed on the shank. Nut 24 is threaded onto the shank and is urged against the washers so that the washers lock the platform 52 and plate 50 in place against the head 18 of the shank. The nut cannot be backed off because the flat end face of end 32 abuts the adjacent flat end face in the wedge-shaped notch 46, thereby preventing rotation of the nut relative to the shank.

While there are many applications in which it is desired that there be no reverse movement of the bolt relative to plates 50 and 52, there are still other applications in which it is desired that the bolt be reversible and capable of being loosened relative to plates 50 and 52. By proper selection of material of washer 22, it is possible to make the locking means of the present invention be reversible to thereby allow separation of the bolt from plates 50 and 52. This can be achieved by applying torque in a reversible direction, i.e. in a counterclockwise sense when viewing FIG. 1A. This torque can be applied to the head of the bolt or to the nut 24. This will cause failure of the washer in that the ends 30 and 32 may be sheared off from the remaining parts of the washer, thereby destroying the locking means and allowing the removal of the nut and the plates 50 and 52 from the bolt.

Depending upon the use to which the bolt connector assembly of the present invention is used, the material of the washer may be selected from the following group of materials:

| | |
|---|---|
| steel | vinyl |
| aluminum | vinyl chloride |
| wood | stainless steel |
| paper | plastic |
| pottery | lead |
| gold | silver |
| copper | nickel |

Instead of applying a torque, heat can be applied to soften the material so that the material can be twisted off the washer so as to destroy the washer. The assembly 10 can then be reassembled by replacing the destroyed washer 22 with a new washer 22. In this way, control of the locking means can be achieved and the locking means will become more versatile in use than it would otherwise be possible.

I claim:

1. A bolt connector assembly for a pair of substantially flat plate members comprising:

a shank member for extending through the plate members;

a head member rigidly coupled to one end of the shank member, at least a portion of the shank member being externally threaded;

a nut member threadably coupled to the shank member;

a split ring washer loosely received on the shank member, said washer having a pair of ends extending transversely of the plane of the washer, said head and nut members being on respective sides of the washer, each of said head and nut pair of members having a notch for receiving the respective end of the washer to provide a blocking means by the end of the washer in the adjacent notch to prevent reverse movement of the shank member when the plate members have been forced into tight frictional engagement with each other.

2. A connector assembly as set forth in claim 1, wherein the nut member being adapted to frictionally engage one of the plate members, the other plate member being threadably mounted on the shank.

* * * * *